United States Patent [19]
Parks

[11] Patent Number: 5,217,765
[45] Date of Patent: Jun. 8, 1993

[54] MICROWAVE OVEN SUSCEPTOR

[75] Inventor: Christopher J. Parks, Ellicott City, Md.

[73] Assignee: Vestvaco Corporation, New York, N.Y.

[21] Appl. No.: 860,753

[22] Filed: Mar. 24, 1992

Related U.S. Application Data

[62] Division of Ser. No. 574,736, Aug. 30, 1990, Pat. No. 5,132,144.

[51] Int. Cl.5 .......................... B65D 5/00; B32B 29/00
[52] U.S. Cl. .................................. 428/34.2; 428/326; 428/206; 428/208; 428/331; 428/408; 428/211; 428/537.7; 428/480; 219/10.55 E; 219/10.55 M
[58] Field of Search ............... 428/537.7, 326, 211, 428/408, 480, 34.2, 206, 208, 331; 426/107, 234, 243; 219/10.55 E, 10.55 M

[56] References Cited

U.S. PATENT DOCUMENTS 4,914,266 4/1990 Parks et al. ................. 219/10.55 E
5,038,009 8/1991 Babbitt ................. 426/107

Primary Examiner—P. C. Sluby

[57] ABSTRACT

Paperboard packaging material for use in the manufacture of cartons for browning and crisping food in a microwave oven is prepared on a printing press using an aqueous susceptor-ink composition comprising graphite or conductive carbon black dispersed in a solution of sodium silicate. The susceptor-ink composition is printed on the packaging material in a pattern corresponding to the location of the food intended to be packaged and the food contact surface is overprinted with an FDA approved food contact coating. The use of sodium silicate as the binder for the susceptor-ink composition allows the composition to be printed by gravure or flexographic printing processes and provides hereto unavailable flame retardant properties to the final packaging material.

8 Claims, 1 Drawing Sheet

MICROWAVE OVEN SUSCEPTOR

This is a divisional, of application Ser. No. 574,736 filed Aug. 30, 1990 now U.S. Pat. No. 5,132,144 granted Feb. 6, 1992.

BACKGROUND OF THE INVENTION

The present invention relates to paperboard packaging material and packages constructed therefrom, and more particularly to an improvement in applicant's prior U.S. Pat. No. 4,914,266 relating to susceptor packaging for heating and browning foods in a microwave oven.

One of the problems associated with the use of microwave energy for cooking is that it fails to brown and crisp those foods which are normally expected to have such a quality. Applicant's prior U.S. Pat. No. 4,914,266, entitled "Press Applied Susceptor for Controlled Microwave Heating", addressed that problem and provided a susceptor packaging material that was useful for the intended purpose. According to applicant's prior patent, it was discovered that both carbon and graphite (i.e., conductive carbon materials), were available in particle sizes which could be readily dispersed into solvent based inks. Moreover, it was found that inks incorporating these materials could be printed on coated or uncoated paperboard in any prescribed pattern with known printing methods and equipment, including gravure and flexography. Furthermore, by overprinting the desired patterns, or by varying the concentration of the carbon susceptor material within the prescribed pattern, the concentration of susceptor material applied in the prescribed pattern could be controlled to obtain useful time-temperature profiles for the most effective browning of different kinds of food. The packaging material manufactured could then be converted into any desired package shape using conventional methods. The performance of such packages was found to be comparable to metallized aluminum susceptors in the generation of heat for browning during microwave cooking. However, the susceptor-ink compositions disclosed in applicant's prior patent had a tendency to char or burn at elevated temperatures when no food was in the packages much like some of the susceptor packaging that use metallized aluminum. Also, the susceptor-ink compositions proved to be difficult to keep in place on the surface of some paperboard, thus causing potential contamination problems. Accordingly the present invention was developed to overcome those problems and to provide susceptor packaging material of improved quality.

SUMMARY OF INVENTION

Carbon and graphite are conductive carbon materials that are available in particle sizes which may be readily dispersed into solvent based inks. Inks incorporating these materials can be printed on coated or uncoated paperboard packaging material, and preferably polyester coated paperboard substrates, to make susceptor packaging materials useful in a microwave oven.

Now, however, according to the improvement in the present invention, it has been discovered that the same or substantially the same conductive carbon susceptor materials may be dispersed in an aqueous vehicle to produce a susceptor-ink composition which is surprisingly capable of being printed using conventional printing techniques such as gravure or flexography. Moreover, the use herein of an aqueous solution of sodium silicate as the binder in the ink vehicle of the susceptor-ink composition also provides flame retardant characteristics to the printed packaging material not available with the prior art products.

Printing inks typically consist essentially of two components, the colorant, an insoluble solid or dye, and a vehicle, a liquid in which the colorant is suspended or dissolved. The combined components form a fluid capable of being printed on a printing press. The vehicle has a secondary function, namely to dry and thus bind the colorant firmly to the printed substrate. Thus, a typical ink formulation is designed to print by a given process, dry under specified conditions, adhere to a given substrate, and perform specific end use applications.

The formulation of a printing ink and its physical appearance are determined greatly by the method by which the image is produced. Inks which are printed by the flexographic and gravure printing processes are characterized by their extremely fluid nature. They are generally described as liquid inks. Both inking systems involve only a short time and distance between the ink supply and the metered film of ink applied to the substrate. Thus, highly volatile solvents can be used and most flexographic and gravure inks are fast drying. Thus, water based inks are rarely used in the gravure and flexographic processes. When used, such use is generally confined to absorbent substrates since for non-absorbent substrates the use of water based inks requires severe curtailment in press speeds because of difficulty in drying. Nevertheless, with the present invention, a water based ink was found to be surprisingly successful primarily because of the use of sodium silicate in the susceptor-ink formulation.

Sodium silicates are compounds of silica ($SiO_2$) and soda ash ($Na_2O$) and are readily available as an aqueous solution. The properties of such solutions are dependent upon the ratio of silica to soda ash. The weight ratio of silica to soda ash varies from about 4:1 to 1.5:1. Such solutions when used as the vehicle in the susceptor-ink formulation of the present invention are believed to be successful because solutions containing silicates dry by absorption of water. It is known that sodium silicate will retain from 10-30% moisture depending upon how it is dried. This permits the sodium silicate containing susceptor-ink formulation of the present invention to be used on a typical gravure or flexographic press, since all of the water in the solution need not be driven off during drying. Moreover, the bound water in the otherwise dried ink formulation applied yields another advantage inherent in the use of sodium silicate, namely, improved fire retardant properties. The use of sodium silicate as a fire retardant additive to paper and paperboard is known, but the present invention is the first known application of sodium silicate as a fire retardant material to packaging material used in microwave ovens.

Furthermore, because the present invention relies on a printing process for applying the susceptor-ink formulation to the paperboard packaging material, the concentration of susceptor and thus the rate of heating and temperature of the susceptor can be controlled by overprinting the packaging material in the desired pattern for accommodating a specific food product. As disclosed in applicant's prior patent, this enables the package designer to obtain useful time-temperature profiles for the most effective browning of different kinds of food in the same package. By applying the susceptor material only in the parts of the food package which contacts the surface of the food, and by varying the amount of susceptor material applied to those areas, it is possible to reach and maintain elevated temperatures at those locations long enough to achieve the crisping and browning desired without overheating other parts of the package. Moreover, because of the presence of the sodium silicate in the susceptor-ink formulation, the possibility of the package catching fire because of overheating is substantially reduced.

DETAILED DESCRIPTION

Figure 1:
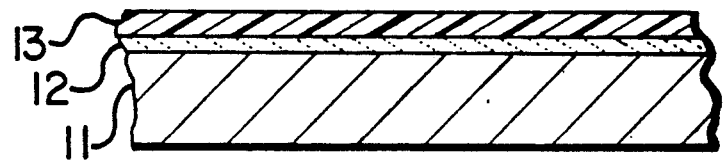

The present invention is directed to the use of graphite or a conductive carbon black susceptor material in the manufacture of susceptor packaging material for the microwave oven. The susceptor material is dispersed in an ink vehicle comprising an aqueous solution of sodium silicate to produce a susceptor-ink composition which is printed on a suitable paperboard substrate using conventional printing technology. The printed susceptor is then overprinted with a barrier coating suitable to provide an FDA approved food contact surface. An example of such a barrier coating is Adcote 33R2AH, a polyester material supplied by Morton International, Chicago, Illinois. The susceptor-ink composition is preferably printed on the paperboard substrate using a rotogravure or flexographic printing process. The concentration of the susceptor composition printed on the substrate is varied to correspond with the location and type of food in the package made with the susceptor packaging material.

FIG. 1 illustrates in cross section the structure of the composite susceptor packaging material according to the present invention. Reference character 11 represents the substrate on which the susceptor-ink composition is printed. When applied to an uncoated substrate 11, the silicate containing susceptor-ink composition of the present invention tends to soak into the substrate. A clay coated substrate presents less problems than uncoated paperboard because the silicate containing susceptor-ink composition readily bonds to the clay coated surface. However, because the silicate containing susceptor-ink composition is essentially retained on the surface of substrates containing a polymeric coating, and particularly the polyester coated paperboard normally used for microwave packaging, primers or additives must be used to bond the silicate containing susceptor-ink composition to the polymer surface. Silanes with an organic component to bond to the polymeric surface and an inorganic component to bond to the silicate containing susceptor-ink composition are useful for this purpose. In any event, as the holdout of the substrate increases, the amount of susceptor-ink composition needed to achieve microwave browning decreases.

Reference character 12 in FIG. 1 designates the susceptor-ink composition printed on the substrate 11. This composition comprises an aqueous solution of sodium silicate into which there is dispersed a conductive carbon material such as graphite or carbon black. Sodium silicate, unlike the solvent binders used in conventional gravure and flexographic printing inks provides the thermal stability necessary for the high temperatures achieved with susceptor packaging materials. The sodium silicate containing susceptor-ink composition of the present invention is surprisingly useful for printing by gravure and flexography. The thermal stability and useful printing characteristics of the susceptor-ink composition disclosed herein is believed to be attributable to the characteristics of sodium silicate coatings which are dried or set by absorption of water so that, even after drying, they still retain considerable bound water on the order of about 10–30% by weight.

Sodium silicate solutions are mixtures of silica ($SiO_2$) and soda ash ($Na_2O$) dissolved in water. The preferred ratio for the present invention is about 3.22 with about 61.7% water. A grade of silicate that has proven to be particularly useful in the present invention is Occidental Chemical's Grade 40-clear, which is prefiltered to remove large particles. Particulate graphite is available in a wide range of particle sizes, shapes and purities. Particle sizes less than about 10 microns are preferred for application with a gravure printing press. Obviously, the highest purity product available is preferred for making food packaging. Superior Graphite's Grade 5539 is an example of a graphite product useful in the present invention. It has a particle size of about 5 microns, it is spherical in shape, and it has a purity of 99.8% carbon. Grade 5539 graphite may be dispersed in a sodium silicate solution at a ratio of 1:1 (graphite to silicate), achieving a total solids of about 40%. A useful susceptor-ink composition for the present invention may comprise a ratio of one part Superior Graphite Grade 5539 to three parts Occidental Chemical sodium silicate Grade 40-clear, adjusted to a total solids of about 40%. This composition has a viscosity of about 20 seconds (#2 Zahn Cup), and is readily printed by the gravure printing process.

Reference character 13 in the Figure represents the food contact overprint applied to the susceptor-ink composition. Layer 13 serves to protect the susceptor-ink composition from moisture as well as to protect the food product from any possible contamination from by-products in the susceptor-ink composition layer 12 or substrate layer 11. Layer 13 may comprise a material selected from the group consisting of acrylics, polyesters and silicones. An example of an overprint suitable for the present invention is ADCOTE 33R2AH from Morton International. Suitable acrylic coatings, for example, Acrylic Latex 26315, are available from B. F. Goodrich, and suitable silicones are available from Dow Corning Corporation (SYL-OFF series 7146, 7044 and 7600).

EXAMPLE I

Susceptor-ink compositions prepared from an aqueous solution of sodium silicate as the binder were printed on clay coated paperboard at graphite concentrations of from about 25% to 75%. Using these compositions it was possible to brown and crisp microwave pizza with a composition containing as little as 25% graphite having a resistivity of about 0.001 mhos/sq. There was no arcing or charring in the range of resistivities tested. Other compositions were found to be useful with resistivities ranging from about 0.0001 mhos/sq. to about 0.006 mhos/sq.

EXAMPLE II

Susceptor-ink compositions were prepared using three grades of graphite, differing in particle size and shape, and two grades of sodium silicate (filtered and unfiltered). All compositions were prepared using 25 parts graphite to 75 parts sodium silicate solution at 40% solids. The compositions were applied to a clay coated paperboard substrate at three different thicknesses, 2 mils, 4 mils and 6 mils. Conductivity measurements made of these compositions showed a direct increase in conductivity with increasing film thickness. Oven tests demonstrated useful browning and crisping of microwave pizza over the range from about 0.0008 mhos/sq. to about 0.0033 mhos/sq. Representative graphite components were MICRO-250-Asbury Graphite, Asbury, New Jersey (0.5 micron spherical particle); Grade 5539 - Superior Graphite, Chicago, Illinois (5 micron spherical particle); and, Grade 7039 - Superior Graphite, Chicago, Illinois (5 micron flake particle). Silicate solutions included 40-clear (Occidental Chemical) and N-Grade (Philadelphia Quartz). MICRO 250 graphite, with a particle size of 0.5 micron was difficult to disperse into the silicate solution and gave inconsistent results in the oven test.

EXAMPLE III

A susceptor-ink composition consisting of 25% graphite and 75% aqueous sodium silicate solution at 40% solids was applied to clay coated paperboard using a 100 lines-per-inch gravure cylinder on a Geiger press. The viscosity of the susceptor-ink composition was 20 seconds, #2 Zahn cup. Up to six bumps on the press were made to determine the coat weight necessary for browning microwave pizza. Based on this trial it was found that at least four bumps on the press were necessary to achieve a resistivity of about 0.0003 mhos/sq., and achieve satisfactory browning of the pizza crust.

EXAMPLE IV

Up to six bumps of the susceptor-ink composition of Example III was applied to clay coated paperboard with a 100 lines-per-inch gravure cylinder and then overcoated with a polyester food contact coating, one or two bumps, using a 150 lines-per-inch gravure cylinder. The overcoat consisted of Adcote 33R2AH polyester. This combination provided good microwave oven browning without any risk of charring. The overcoat also prevented the susceptor-ink composition from being rubbed off the surface of the paperboard substrate both before and after cooking. The overcoat meets existing FDA guidelines for direct food contact provided all of the solvent is driven off during drying.

It will thus be seen that the present invention discloses an improvement in microwave susceptor packaging that may be practiced on a printing press. The improvement yields additional benefits not addressed by the prior art. Although the process and product has been described somewhat specifically, it is to be understood that various modifications and alternatives are available without departing from the spirit and scope of the appended claims.

I claim:

1. A susceptor food package for use in a microwave oven comprising:
   (a) a food package formed from a dielectric substrate;
   (b) a microwave susceptor material in the form of a susceptor-ink composition printed on the food package only in the areas of the food package which contact the surface of the food, said susceptor-ink composition comprising an aqueous solution of sodium silicate having dispersed therein a conductive carbon pigment in sufficient quantity to achieve a surface resistivity of between about 0.001–0.006 mho/sq.; and,
   (c) a barrier coating applied over the printed susceptor-ink composition to provide a food contact surface for the packaged food.

2. The susceptor food package of claim 1 wherein the amount of susceptor-ink composition applied to the food contact areas is varied depending upon the food product to achieve crisping and browning of the food product without overheating other parts of the package when the package is exposed to microwave radiation.

3. A susceptor for heating food in a microwave oven comprising, a microwave transparent dielectric substrate comprising paperboard, said paperboard having printed on one surface thereof a microwave susceptor-ink composition comprising a conductive carbon pigment material dispersed in an aqueous solution of sodium silicate binder material, said susceptor-ink composition containing from about 25–75 parts pigment and from about 75–25 parts binder at 40–55% solids, and having a viscosity of from about 20–50 seconds, measured by a No. 2 Zahn Cup, to achieve a surface resistivity of between about 0.001–0.006 mho/sq., and a barrier coating formulation applied over said susceptor-ink composition.

4. The susceptor of claim 3 wherein the substrate is clay coated paperboard and the susceptor-ink composition is applied to the clay coated surface of said paperboard.

5. The susceptor of claim 3 wherein the substrate is polyester coated paperboard and the susceptor-ink composition is applied to the polyester coated surface of said paperboard.

6. A susceptor for crisping and browning food in a microwave oven comprising:
   (a) a microwave transparent dielectric substrate comprising paperboard;
   (b) a susceptor-ink composition printed on one surface of said dielectric substrate, said susceptor-ink composition comprising a conductive carbon pigment dispersed in an aqueous solution of sodium silicate in sufficient quantity to achieve a surface resistivity of from about 0.001–0.006 mho/sq.; and,
   (c) a food barrier coating applied over said susceptor-ink composition.

7. The susceptor of claim 6 wherein the susceptor-ink composition comprises from about 25–75 parts pigment and from about 75–25 parts sodium silicate at 40–55% solids and has a viscosity of from about 20–50 seconds measured by a No. 2 Zahn Cup.

8. Susceptor packaging material capable of the generation of heat by absorption of microwave energy comprising:
   (a) a microwave transparent dielectric substrate comprising paperboard;
   (b) a susceptor-ink composition printed on one surface of said substrate in a pattern corresponding to the location of food intended to be packaged with said packaging material and in varying concentration so as to control the rate of heating and temperature reached when exposed to microwave radiation, said susceptor-ink composition comprising a conductive carbon pigment dispersed in a printable aqueous solution of sodium silicate, to achieve a surface resistivity in the range of from about 0.001–0.006 mho/sq.; and,
   (c) a barrier coating applied over said susceptor-ink composition.

* * * * *